United States Patent [19]

Martin

[11] 4,164,218
[45] Aug. 14, 1979

[54] PERSONAL ESCAPE BREATHING APPARATUS

[75] Inventor: Frank E. Martin, Chester, Md.

[73] Assignee: Midori Anzen Company, Ltd., Tokyo, Japan

[21] Appl. No.: 859,224

[22] Filed: Dec. 9, 1977

[51] Int. Cl.² .................................. A62B 7/00
[52] U.S. Cl. ........................ 128/142.7; 128/142 R; 128/191 R
[58] Field of Search ........... 128/142.7, 142 R, 141 R, 128/142.2, 142.3, 142.4, 142.5, 142.6, 145 R, 147, 191 R, 202

[56] References Cited

U.S. PATENT DOCUMENTS

| 1,978,994 | 10/1934 | Fortunato | 128/142.7 X |
| 3,565,068 | 2/1971 | Bickford | 128/142 R |
| 3,655,346 | 4/1972 | Cotabish et al. | 128/191 R X |
| 3,877,425 | 4/1975 | O'Neill | 128/202 X |

FOREIGN PATENT DOCUMENTS

| 1511012 | 1/1968 | France | 128/142 R |
| 7708863 | 8/1977 | Netherlands | 128/142.7 |
| 4378 | of 1913 | United Kingdom | 128/191 R |

*Primary Examiner*—Henry J. Recla
*Attorney, Agent, or Firm*—Wenderoth, Lind & Ponack

[57] ABSTRACT

The personal escape breathing apparatus comprises exhalation and inhalation bags connected by a carbon dioxide absorption canister, a chemical oxygen generator connected to the exhalation bag and a relief valve for releasing built-up gas within the exhalation bag. The two unequal size bags provide a flexible volume sufficient to store the user's vital capacity a surface area sufficient to cool gas heated from the exothermic reaction of $O_2$ generation and $CO_2$ absorption, but the bags are readily foldable to minimize the stored size. The two bags are integrally formed on a flexible, gas impermeable sheet which serves both as the back walls of the bags as well and as a support collar which extends from the bags and has a hole for passing the user's head therethrough. The apparatus also comprises a flexible transparent hood and nose block to protect the user from the hostile environment.

5 Claims, 2 Drawing Figures

PERSONAL ESCAPE BREATHING APPARATUS

BACKGROUND OF THE INVENTION

This invention relates to closed circuit personal escape breathing apparatus.

In the event of a fire, a factory accident, a coal mine accident or an oxygen deficiency accident, an antitoxic mask is not effective for protecting the user. To provide a personal breathing apparatus effective under such circumstance, various types of breathing apparatus comprising a self-contained oxygen source have been proposed. Most of them utilize an oxygen bottle or a compressed air bottle as an oxygen source. Although oxygen bottles are more often used because they supply high-purity oxygen gas quite handily and compactly, they must be handled and stored with special care. Also, both oxygen and compressed air bottles are heavy, resulting in a heavy and unnecessarily sturdy overall structure for a self-rescue escape breathing apparatus.

On the other hand, it is also known to use a chemical oxygen generator as a source of oxygen for a personal escape breathing apparatus. Although a chemical oxygen generator is light in weight and easy to store compared to oxygen or compressed air bottles, the overall structure of the breathing apparatus including a carbon dioxide canister, breathing bags, a hood, a mouthpiece, etc., is still heavy and bulky. Most such personal breathing apparatus also require special training for safe use.

SUMMARY OF THE INVENTION

Accordingly, an object of the present invention is to provide a safe, light weight and compact personal escape breathing apparatus having a chemical oxygen generator.

Another object of the present invention is to provide a breathing apparatus capable of effectively cooling the high temperature breathing gas to a breathable temperature.

Another object of the present invention is to provide a breathing apparatus comfortably and easily wearable by the user which enables the user to move quickly.

Still another object of the invention is to provide a breathing apparatus having a hood for protecting the user.

A further object of the invention is to provide a breathing apparatus storable in a small package.

A still further object of the invention is to provide a breathing apparatus simple in structure, low in manufacturing cost, and easily used by an untrained person.

With the above objects in view, the personal escape breathing apparatus of the present invention comprises an elongated, flexible, gas-impermeable exhalation bag for receiving exhaled gas from the user. One side of the exhalation bag is directly connected to one of two relatively large opposing open ends of a cylindrical carbon dioxide absorption canister so that it extends substantially perpendicular to the length of the exhalation bag. A chemical oxygen generator is connected to the exhalation bag for supplying oxygen into the exhalation bag. The oxygen generator is thermally insulated and supported from the canister parallel thereto. The cylindrical canister is directly connected at its other large open end to a flexible, gas-impermeable inhalation bag. The inhalation bag is larger in volume than the exhalation bag and, in cooperation with the exhalation bag, supports the canister between the two bags. Part of the side walls of the bags is a common partition wall dividing the two bags. Support means made of a flexible, gas-impermeable sheet material and having a hole through which the user's head can be passed is provided. The support means is integrally attached at its large area portion to the back of the two breathing bags to form integral back walls of them, and its portion with the hole extends from the bags to provide a collar placed around the user's neck. The personal breathing apparatus also comprises a transparent, flexible and gas-impermeable hood for defining a substantially closed space around the user's head. Into the space within the hood extends a mouthpiece connected to the exhalation and the inhalation bags, providing an interface between the user and the apparatus. The hood is provided therein with nose blocking means comprising a frame supported on the inner surface of the hood so that the frame is positioned in front of the user's nostrils, and a soft, flexible and gas-impermeable film such as rubber stretched over the frame to contact the user's nostrils and extend over an area effective for covering the user's nostrils.

BRIEF DESCRIPTION OF THE DRAWING

The present invention will become more readily apparent from the following description of the preferred embodiment of the present invention taken in conjunction with the accompanying drawing, in which.

DESCRIPTION OF THE PREFERRED EMBODIMENT

Figure 1:
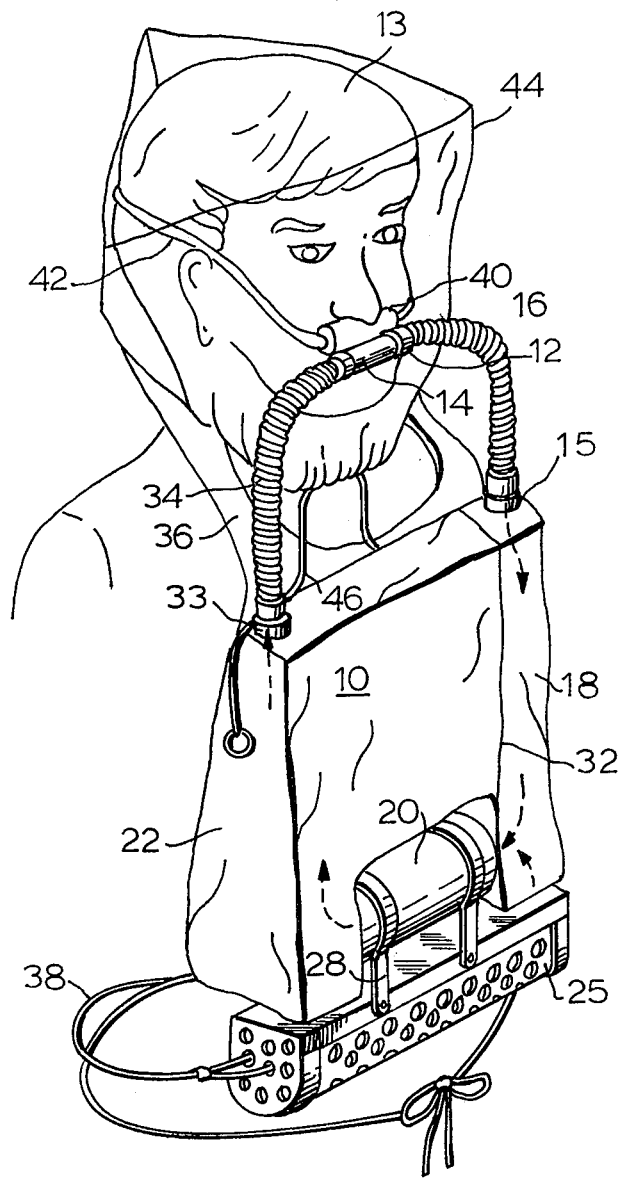
FIG. 1 is a perspective view of a breathing apparatus constructed in accordance with the present invention in its used position.
Figure 2:
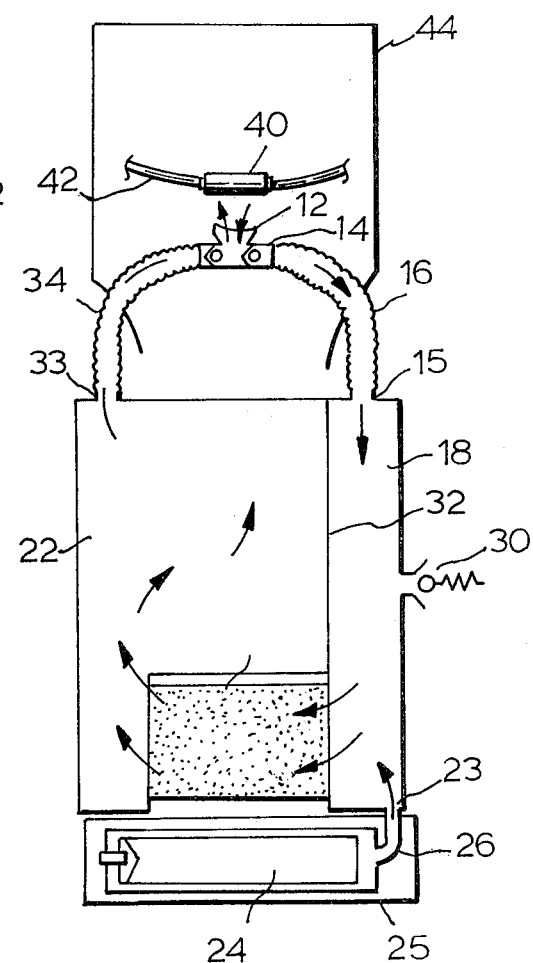
FIG. 2 is a schematic view showing the general arrangement of the breathing apparatus.

Referring to FIGS. 1 and 2, a breathing apparatus 10 of the present invention comprises a mouthpiece 12 serving as an interface between the breathing apparatus 10 and the user 13. The mouthpiece 12 may be of any conventional type comprising a unidirectional switch valve 14 which is connected by a flexible hose 16 to an inlet 15 of an exhalation bag 18. Thus the exhaled gas from the user flows through the mouthpiece 12 and the hose 16 into the exhalation bag 18 wherein the exhaled gas is received and stored.

The exhalation bag 18 is made of a relatively thin, flexible and gas-impermeable material such as plastic film. Preferably, the exhalation bag is of incombustible plastic film such as polyvinyl chloride film, or more preferably, of a fire-resistant material such as poly tetrafluoroethylene. At the lower side of the exhalation bag 18, a relatively large opening is formed, and the opening communicates with an open end of cylindrical carbon dioxide absorption canister 20. The carbon dioxide absorption canister 20 may be any well known type containing a carbon dioxide absorbent and serves to absorb carbon dioxide contained in the exhaled gas stored in the exhalation bag 18. The other open end of the carbon dioxide absorption canister 20 is coupled to a large inhalation bag 22. Similar to the exhalation bag 18, the inhalation bag 22 is made of a relatively thin, flexible and gas-impermeable material such as plastic film preferably of polyvinyl chloride, or more preferably of poly tetrafluoroethylene.

The exhalation bag 18 also has at its lower end an oxygen inlet port 23 connected to a chemical oxygen generator 24. The typical chemical oxygen generator 24 which may be used in the present invention includes the so-called chlorate candle wherein oxygen is generated by pyrolysis of chlorate. This type of oxygen generator also generates small amounts of carbon dioxide, carbon monoxide, chlorine, etc., in addition to oxygen. Most of the commercially available chlorate candles contain therein an absorbent for these undesirable by-product gases. If the chlorate candle used has no absorbent for these gases or has an absorbent of only an insufficient capacity, a by-product gas absorbent may be inserted within the carbon dioxide absorbing canister 20. An oxygen generator which can generate oxygen at a rate of about 2 to 4 liters per minute for about 10 to 60 minutes is suitable.

The oxygen generator 24 generates oxygen by chemical reaction and supplies it to the exhalation bag 18 through an oxygen supply pipe 26 connected to the inlet port 23. The outer casing of the oxygen generator 24 is made of a material having good heat dissipation characteristics such as a metal. The oxygen generator 24 is secured within, and surrounded by, a perforated metal or plastic stand-off cage, 25. This cage prevents user contact with the hot surface of oxygen generator 24 and is secured to the carbon dioxide absorbing canister 20 by any suitable securing means such as support straps 28 wound around the carbon dioxide absorbing canister 20 which is also made of a metal having good heat dissipation characteristics.

Thus, virtually pure oxygen generated from the oxygen generator 24 is supplied through the inlet port 23 into the exhalation bag 18, wherein the oxygen and the exhaled gas are mixed. The mixed gases in the exhalation bag 18 pass through the canister 20 wherein the carbon dioxide gas contained in the mixture is completely absorbed by the absorbent, thereby allowing only a mixture of pure oxygen and nontoxic gases to flow into the inhalation bag 22.

In order to prevent building up of a relatively high pressure in the exhalation bag 18, a relief valve 30 is disposed in the wall of the exhalation bag 18. The relief valve 30 is preferably mounted at a position as remote as possible from the oxygen supply pipe 26 or the inlet port 23 so as to reduce the chances for the high-purity oxygen to escape from the relief valve 30. The relief valve 30 may be set to open with an inner pressure of about 60 mm $H_2O$.

The inhalation bag 22 is made of a relatively thin, flexible gas-impermeable material and has a larger volume than that of the exhalation bag 18. The general configuration of the inhalation bag 22 is such that it forms the general contour of the breathing bag system when it is coupled with the exhalation bag 18 as illustrated in the Figures. The outlet end of the canister 20 is coupled to a lower projecting portion of the inhalation bag 22, one side wall of the major portion of the inhalation bag 22 is arranged along the outer surface of the canister 24, and another side wall of the major portion of the bag 22 is directly attached to the corresponding wall of the exhalation bag 18. The wall between the two bags 18 and 22 may be a common single partition wall 32 defining two separate spaces as illustrated in the Figures. The upper portion of the inhalation bag 22 has an outlet 33, and the outlet 33 is communicated to the mouthpiece 12 through an exhalation hose 34.

In order to support the breathing apparatus 10 on the user's chest, a support collar 36 is provided. The support collar 36 is made of a flexible, gas-impermeable sheet material, preferably the same material as that for the exhalation and inhalation bags 18 and 22. The support collar 36 has a round collar portion with a hole through which the head of the user 13 can be passed so that the collar portion is placed on the user's shoulders and around the neck. The support collar 36 also has a large square portion hermetically sealed to the breathing bags 18 and 22 to form their back walls. In other words, two breathing bags 18 and 22 are sealed at their back open sides to the square portion of the support collar 36. Therefore, the breathing bags 18 and 22, the carbon dioxide absorbing canister 20, and the oxygen generator 24 and stand-off cage 25 are directly or indirectly supported from the support collar 36 formed integral with the breathing bags 18 and 22.

A set of pull-cords 38 is attached to the stand-off cage 25 to assist the user 13 to stably fit the breathing apparatus 10 on his chest.

When in use, the user 13 wears a nose block 40 to close his nostrils. The nose block 40 is made of hollow cylindrical or trough-shaped flexible thin film, such as a film of rubber, polyethylene, or polyurethane, supported by a suitable frame or a cylindrical polyurethane foam block. The nose block 40 has a rubber string 42 connected to the frame for supporting the block 40 at the user's nostrils to close them. The support string 42 is attached to the inner rear surface of a transparent plastic hood 44 so that the nose block 40 can be elastically put on to close the nostrils at the same time the user 13 puts the hood 44 on his head. Preferably, the hood is made of a fire resistant material. The hood 44 covers the user's head completely, and has a piece of string 46 for closing the hood 44 around the user's neck to substantially close the space through which the breathable gas can escape and a hostile environmental atmosphere can enter into the hood 44. The transparent hood 44 also has an opening (not shown) at a location corresponding to the user's mouth to which opening the mouthpiece 12 of the breathing apparatus 10 is secured to extend into the interior of the hood 44 and reaches the mouth of the user 13. Thus, the user 13 can safely respire the breathable gas supplied from the breathing apparatus 10 without any danger of inhaling hostile gases.

When the user uses the breathing apparatus of the present invention, he ignites the chemical oxygen generator 24 prior to putting on the transparent hood 44. When the exhalation bag 18 and the inhalation bag 22 are filled with oxygen generated from the oxygen generator 24, the user puts the support collar 36 around his neck, thereby supporting and wearing the breathing apparatus 10 on his chest. Of course, the breathing apparatus can be put on before the oxygen generator 24 is ignited. In order to stably fit the breathing apparatus on the user's chest, the cord 38 is wound around his waist.

When the generation of oxygen is confirmed, the user 13 puts on the transparent hood 44, the mouthpiece 12 and the nose block 40, and then pulls the string 46 to close the hood 44 around his neck as seen in FIG. 1. At this time, the user 13 can safely breathe the breathable gas.

Because of its chemical nature, the chemical oxygen generator 24 generates oxygen gas of as high as 140° C. at the outlet. Further, the reaction of exhaled $CO_2$ with absorbent in canister 20 substantially elevates gas temperature. However, with the breathing apparatus as has heretofore been described, the oxygen gas is cooled by heat exchange action with the atmosphere while the gas is flowing through the oxygen supply pipe 26, the exhalation bag 18 and the inhalation bag 22 which have large surface areas. Also, the casings of the oxygen generator 24 and the carbon dioxide canister 20 have good heat dissipating characteristics to cool themselves. Therefore, the mixture of the pure oxygen and air supplied to the user from the mouthpiece 12 will be at a temperature below 50° C. at the normal operating condition, thereby enabling safe respiration.

Even when the amount of oxygen generated from the chemical oxygen generator 24 varies, the flexible, large-volume exhalation bag 18 and the inhalation bag 22 function to absorb or dampen these variations, thereby always maintaining the inner pressure within the bags 18 and 22 at substantially atmospheric pressure, providing no difficulty in breathing by the user. In the event that an excess amount of oxygen is temporarily generated from the oxygen generator 24, or the inner pressure within the system increases because of the accumulated excess amount of oxygen when the oxygen consumption is less than the oxygen generation, the relief valve 30 opens to release the excess amount of gas from the exhalation bag 18 into the atmosphere.

The breathable gas supplied at the mouthpiece 12 is substantially free from carbon dioxide gas because the flow direction of the gas within the apparatus is unidirectional through the carbon dioxide absorption canister 20. Also the breathing resistance is very small because the inner pressure of the system is substantially at the atmospheric pressure and because the system has been sized to eliminate points of flow restriction. For example, the large open ends of canister 20 minimize flow restriction.

The breathing bag and canister systems of the present invention are advantageous in that they are very simple and compact in structure. Also, the apparatus is light in weight and easy to handle and is foldable for convenience in storing.

Since the breathing apparatus 10 is light in weight and flexible and the overall arrangement of the apparatus and the selection of the respective components has been carefully made, the user can very easily, quickly and safely put on the breathing apparatus without any special training and with minimum instructions.

The breathing apparatus of the present invention comprises a transparent, fire-resistant plastic hood 44 for completely covering the head of the user. Therefore the user is protected against toxic gases, smoke, sparks, dust or the like. When necessary, the user can talk to other people while wearing the hood simply by removing the mouthpiece from his mouth. The transparent hood 44 provides an excellent field of view and does not significantly interrupt sound, so that the user can protect himself from any dangerous situation.

The many above mentioned advantages of the emergency breathing apparatus of the present invention over the conventional breathing apparatus of similar type and its low manufacturing cost make the apparatus of the present invention the most suitable for storing in various places such as factories, mines, lower level shopping areas, etc.

In order to assure that the above mentioned effects be fully obtained, the exhalation bag 18 and the inhalation bag 22 should both be exposed to the atmosphere without being covered by any thermally nonconductive material such as cloth so as not to degrade the dissipation of heat from the oxygen generation and carbon dioxide absorption. Also, the exhalation bag 18 and the inhalation bag 22 are designed to have a large volume and a large surface area to enhance the heat dissipation. With the inhalation bag 22 larger than the exhalation bag 22, a better result will be obtained. The exhalation bag 18 preferably has dimensions of from 1 to 3 liters for the interior volume and of from 600 to 2,000 square centimeters for the outer surface area, while the inhalation bag 22 preferably has dimensions of from 3 to 5 liters for the interior volume and of from 1,500 to 4,000 square centimeters for the outer surface area.

The inhalation hose 34 and the exhalation hose 16 are preferably independent from each other as illustrated in FIGS. 1 and 2. The plastic hoses 16 and 34 are connected to a unidirectional valve 14 which allows the exhaled gas only to enter into the exhalation hose 16 and which allows the breathable gas only to pass through the inhalation bag 22 to the mouthpiece 12. Since the hoses 16 and 34 are independent, there is substantially no chance for the exhaled gas to be inhaled by the user without being purified unless unlikely unidirectional valve failure occurs.

It is apparent that the general public has been provided with a personal escape breathing apparatus that can be made available in quantity in public dwellings, etc., and that is light in weight, highly compact, simple to use, inexpensive and has a long storage life.

What is claimed is:

1. A breathing apparatus comprising;
   an elongated, flexible, gas-impermeable exhalation bag for receiving and storing exhaled gas from a user;
   a substantially cylindrical carbon dioxide absorption canister for removing carbon dioxide from said exhaled gas within said exhalation bag and providing a breathable gas, said canister having two relatively large opposing open ends one of which is directly connected to a side of said exhalation bag, the longitudinal axis of said canister being substantially perpendicular to the length of said exhalation bag;
   a chemical oxygen generator connected to said exhalation bag for supplying oxygen into said exhalation bag, said oxygen generator being supported from and thermally insulated from said carbon dioxide absorption canister and being in a substantially parallel and side-by-side relationship with respect to said canister;
   a flexible, gas-impermeable inhalation bag for receiving and storing the breathable gas from said carbon dioxide absorption canister, said inhalation bag being larger in volume than said exhalation bag and directly connected to the other open end of said canister to support said canister between said inhalation and exhalation bags, said inhalation bag being directly attached to said side of said exhalation bag;
   a transparent, flexible and gas-impermeable hood for defining a substantially closed space around the head of a user;
   means, including a mouthpiece connected to said exhalation bag and said inhalation bag, for receiving the exhaled gas from the user and introducing the exhaled gas into said exhalation bag, and for supplying the breathable gas stored within said inhalation bag to the user, said mouthpiece being open to said closed space defined by said hood;
   nose blocking means attached to said hood for blocking the gas inflow into the nostrils of the user, said nose blocking means comprising a frame supported on the inner surface of said hood so that said frame is positioned in front of the user's nostrils when said hood is worn, and a film of a soft, flexible and gas-impermeable material stretched over said frame to extend over an area effective for covering and contacting the user's nostrils; and support means, made of a flexible, gas-impermeable sheet material and having a hole through which the user's head can be passed, for integrally supporting said exhalation and inhalation bags and the breathing apparatus from the user's neck on the user's chest, said support means forming a part of said exhalation and inhalation bags.

2. A breathing apparatus as claimed in claim 1 wherein said breathing apparatus further comprising a relief valve disposed on said exhalation bag for releasing an excess amount of built-up pressure within said exhalation bag.

3. A breathing apparatus as claimed in claim 1 wherein said hood is in the form of a bag having a lanyard around its opening, said lanyard closing the opening around the neck of the user when it is tightened.

4. A breathing apparatus as claimed in claim 1 wherein said means for closing the user's nostrils is attached to the inner surface of said hood by an elastic string.

5. A breathing apparatus as claimed in claim 1 wherein said hood is made of a fire-resistant plastic.

* * * * *